No. 760,422. PATENTED MAY 24, 1904.
J. E. CHAMBERS.
STIGMATOMETER.
APPLICATION FILED NOV. 30, 1903.
NO MODEL. 2 SHEETS—SHEET 1.

Witnesses:—
Ernest Pulsford.
M. I. Dixon.

Inventor:—
John E. Chambers.
By his Attorney
Henry H. Bates.

No. 760,422. PATENTED MAY 24, 1904.
J. E. CHAMBERS.
STIGMATOMETER.
APPLICATION FILED NOV. 30, 1903.
NO MODEL. 2 SHEETS—SHEET 2.
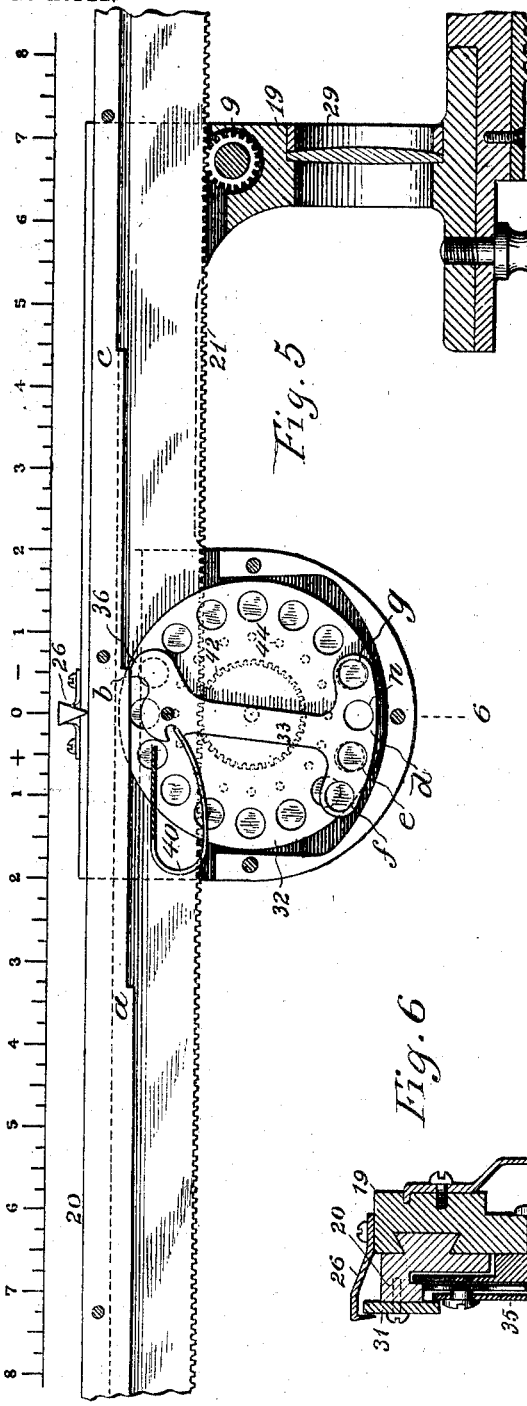
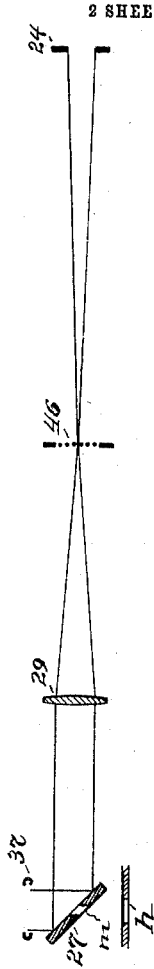
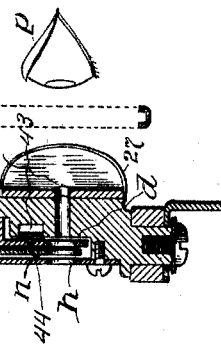
Witnesses:—
Ernest Pulsford.
M. I. Dixon.
Inventor:
John E. Chambers,
By his Attorney,
Henry H. Bates.

No. 760,422. Patented May 24, 1904.

UNITED STATES PATENT OFFICE.

JOHN E. CHAMBERS, OF CHICAGO, ILLINOIS.

STIGMATOMETER.

SPECIFICATION forming part of Letters Patent No. 760,422, dated May 24, 1904.

Application filed November 30, 1903. Serial No. 183,228. (No model.)

*To all whom it may concern:*

Be it known that I, JOHN E. CHAMBERS, a citizen of the United States, residing at Chicago, in the county of Cook and State of Illinois, have invented new and useful Improvements in Stigmatometers, of which the following is a specification.

My invention relates to that class of optical instruments used by opticists to measure defects and abnormalities of the eye, and is adapted for the threefold purpose, first, of an ophthalmoscope for ordinary direct inspection of the retina; second, for accurately measuring the refractive power of the eye to bring light-rays to a focus independently of the subjective impressions of the patient to obtain the requisite data for constructing lenses for the correction of myopia or hyperopia, and, third, for the measurement of the unequal refractive powers of the eye in different planes for the detection of astigmatism where present, owing either to irregularities in the form of the cornea or inequalities in the refractive power of the crystalline lens. Being therefore a measurer of the exact relative position of the stigmata or focal points of convergence of the visual rays entering the eye in different planes, I have named my instrument a "stigmatometer."

Figure 1:
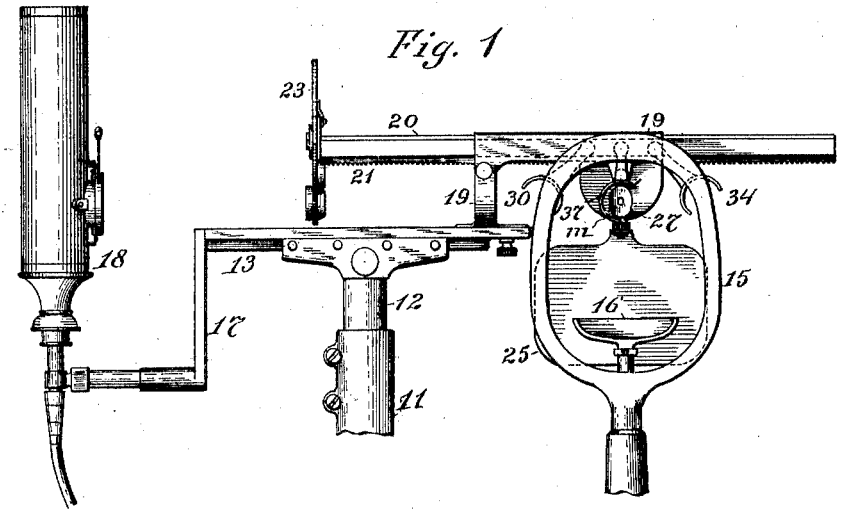
Figure 2:
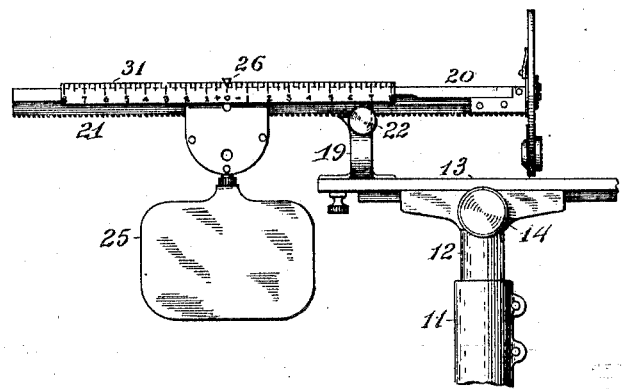
Figure 3:
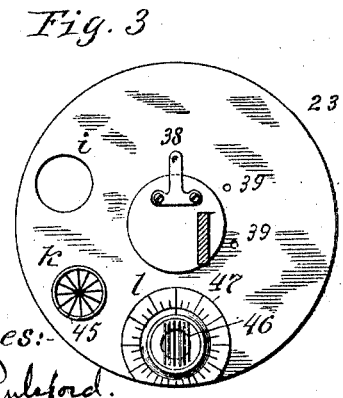
Figure 4:
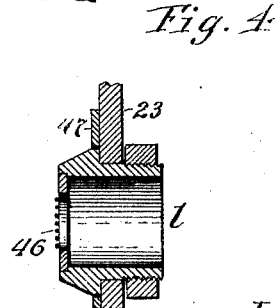

In the drawings forming a part of this specification, Figure 1 is a rear elevation from the side occupied by the patient. Fig. 2 is a partial front elevation from the side of the operator, showing the graduated dioptric scale. Fig. 3 is an enlarged front view of the revoluble disk which carries the gratings forming the visual object. Fig. 4 is an enlarged sectional view through the revoluble parallel line grating of the disk. Fig. 5 is a detail view of the lens-carrying disk through which the operator views the patient's eye and the auxiliary lens-carrier. The dioptric scale is shown in this figure detached. Fig. 6 is a vertical sectional view taken through the rotatory lens-carrying disk and the auxiliary lens-carrier on line 6 of Fig. 5. Fig. 7 is a diagrammatic view showing the course of the light-rays from the source of light to the eye of the patient.

The working parts of the instrument are mounted on the usual pedestal or base 11, swiveled on a vertically-movable support 12 in said pedestal. The plate 13 is movably held on this support traversable back and forth by means of the milled head 14, which operates a pinion meshing into a rack 10, concealed beneath the plate.

15 is a face-hoop fixed on the pedestal or base, carrying the chin-rest 16, vertically adjustable in the usual manner. On the end of plate 13 to the left, Fig. 1, is a bracket 17, carrying a source of light 18 for illuminating the eye of the patient and the visual object focused therein.

19 is a standard on the movable plate 13, which carries the separately-movable scale-piece 20. On the under side of said scale-piece is the fine-toothed rack 21, engaged by a pinion 9, concealed in the standard 19 and operated back and forth by the milled head 22. On the end of this scale-piece toward the lamp, mounted in a plane at right angles thereto, is a rotatory disk 23, apertured at $i$ $k$ $l$ for transmitting the beam of light emitted from the lamp 18 in the direction of the plane mirror 27.

At 28 in the standard 19 is inserted a convex lens 29 for collecting the rays of light diverging from the illuminated grating and throwing them in the direction of said plane mirror, which is carried at an angle of forty-five degrees on the under side of scale-piece 20 for the purpose of reflecting the light-rays at right angles to their previous course, so as to enter the eye of the patient at $p$, fixed in position within the face-hoop 15. The mirror is accurately brought in front of the eye to be inspected by means of the milled head 14. This mirror is centrally perforated with an aperture $m$ to afford a passage for the inspection of the illuminated interior of the eye by the operator. Mounted on the movable scale-piece 20 is the dioptric scale 31, graduated in quarter-diopters each way from the zero-point, which indicates the correct focal point of convergence of rays in the normal eye. 26 is a fixed pointer for marking said indications. These rays enter and emerge from the normal eye as a parallel beam, but in the abnormal eye, which has either deficient or excessive convergent power, they do not emerge parallel when focused on the retina, and a corrective for the eye of the observer is therefore required to correspond to the refractive power added or subtracted by moving the dioptric scale. This is supplied by the rotatory lens-disk 32, provided with sixteen apertures, one of which, $n$, is open for the observance of normal eyes, the others being occupied by lenses of different powers graded by quarter-diopters from plus 0.25 diopter up to plus 3.75 diopters. The scale 31, however, has a greater range than this, running ordinarily up to eight diopters negative and 7.75 diopters positive, counting each way from the zero-point. This, with the zero-point, gives sixty-four points of observation, which are too many to be accommodated within the compass of a lens-disk of ordinary and convenient dimensions. To provide for this and for the positive and negative readings required, an auxiliary lens-plate 33 is introduced, pivoted to oscillate in front of the rotary disk 32. (Shown in Fig. 5 with the cover-plate removed.) Said plate has four apertures, one of which, $d$, is open, and the others are filled with corrective lenses of different powers to coöperate with the lenses of disk 32, and thus by differential action furnish the required corrections for refractions of four diopters and over positive and 0.25 up to eight diopters negative. Thus to the left of aperture $d$ in the auxiliary lens-plate 33 as it stands in the apparatus are provided the negative or concave lenses $e$ and $f$ of minus four and minus eight dioptric power, respectively. To the right of aperture $d$ as the plate stands in the apparatus is the positive on convex lens $g$ of plus four dioptric power. These by automatic coöperation with the rotating lenses in the rotatory disk 32, by means hereinafter described, furnish all the succcessive corrections needed up to 7.75 diopters positive and eight diopters negative by quarter-diopters. The dioptric scale 31 being in engagement with the rotatory lens-disk 32 by means of rack 21 and pinion 42 the two move together, when the scale is moved either to the right or left by means of the milled head 22 and attached pinion. For positive indications on the scale when the latter is moved toward the right from zero-point, thereby counting toward the left, new lenses are successively brought before the inspection-aperture $h$ in the cover-plate 35 for each division of the scale, said lenses being of a corrective power ranging from plus 0.25 diopter up to plus 3.75 diopters for the fifteenth or last lens. At the sixteenth movement, corresponding to four diopters positive on the scale, the zero-aperture $n$ comes again into position; but here the auxiliary plate 33 is brought into operation, the ratchet $a$, formed within the scale-piece 20, engaging the lug 36 and moving it, with the auxiliary lens-plate, exactly the distance to bring the auxiliary lens $g$ of plus four diopter power opposite the inspection-aperture. At the next division of the scale, supposing the same to continue to move in the positive direction, the disk-lens of plus 0.25 diopter power comes into position behind the auxiliary lens $g$ of plus four diopter power, making the total correction plus 4.25 diopters to correspond to the indication of the scale, and so on, adding plus 0.25 diopter power in each successive lens coming into position up to the fifteenth lens of the rotary disk and the 7.75 diopter division of the scale, when the capacity to measere in that direction is exhausted except by the use of a coöperative lens inserted in the lens-holder 37, borne on standard 19 behind the aperture $m$ of mirror 27 for that purpose. This lens-holder is also utilized for inserting a corrective lens for eyes of abnormal refractive power transcending the limits of the eight diopter scale, negative.

For myopic readings when the scale moves in the negative direction with reference to the zero-point, or toward the left, the auxiliary lens-plate 33 comes into operation at once. The first lens of the lens-disk 32 to the right of the zero-aperture $n$ is the fifteenth of the series of plus 3.75 diopter power. This lens comes into the field of inspection at the first negative division of the scale indicating minus 0.25 diopter. The corrective lens therefore should be of the same power. The ratchet $b$ at this point releases the lug 36, which permits the spring 40 to throw the auxiliary plate 33 the distance of one lens division to the right, thus bringing the lens $e$ of minus four diopter power in front of the inspection-aperture already occupied by a lens of plus 3.75 diopter power. The differential result is the same as if a lens of minus 0.25 power were in the inspection-field. The next movement of the scale brings a lens of plus 3.50 power, or the fourteenth of the rotatory series, into the field, which, with the auxiliary lens $e$, makes a net total of minus 0.50 power, and so on up to the minus four diopter mark of the scale, when the rotatory disk arrives again at the open aperture $n$, where the minus four power auxiliary lens $e$ in position gives the correct indication. At the next move the auxiliary lens-plate comes again into play by means of ratchet $c$, which releases lug 36, allowing the auxiliary plate to move another step, bringing the auxiliary lens $f$ of minus eight diopter power in front of the inspection-aperture. This, combined with the disk-lens of plus 3.75 diopter power, gives the correct reading of minus 4.25 diopter power in the corrective combination, which corresponds with the reading of the scale. So on up to minus eight diopters of the scale, when the auxiliary lens $f$ of minus eight diopter power is in front of the inspection-aperture. For negative or myopic readings beyond this point a coöperative concave lens inserted in lens-holder 37 is brought into requisition similarly to the case of high positive readings, as before stated.

The three apertures of the rotatory disk 23 have been referred to. Of these, one, $i$, is open for the transmission of a light-beam for simple inspections of the interior of the eye, as with an ophthalmoscope. Aperture $k$ is occupied by a radial grating 45 of twelve rays thirty degrees apart, such as is commonly used to detect astigmatism by subjective observation. Aperture $l$ is occupied by a parallel line-grating 46 to form a parallel line-image on the retina for a more perfect determination of the focal depth as well as the angle of astigmatism, if any, and this is revoluble and surrounded by a graduated angular scale 47, so that the angular deviation of the different focal planes from each other may be accurately determined.

Beneath the lens-disk and in front of the face-hoop is suspended an adjustably-revoluble shield 25 for the protection of both patient and operator from too close contact of breath during inspection. On each side of lens-holder 37 are lens-holders 30 34, so spaced from the central lens-holder 37 as to come in front of the eye not under inspection. Their purpose is to hold a lens of such refractive power as to afford rest for the adjustment muscles of the patient's eyes, which work in sympathy, by a comfortable relaxation, thereby relieving the eye under inspection from strain and unconscious variability of focal adjustment so far as possible. Either lens-holder is brought into position by the to-and-fro movement of plate 13.

The rotatory disk 23 is provided with a spring stop-pin 38, engaging with stop-depressions 39, to secure accuracy of position for the three steps to which the disk is to be rotated. A similar provision is made for the rotatory lens-disk 32 in the spring 43 and depressions 44. (Shown in Fig. 6.)

In Fig. 7 the light-rays shining through the iris-gate of the lamp 18 converge upon and illuminate the grating 46, located in their path, whence they diverge and strike upon the convex lens 29, where they are collected and refracted toward the plane mirror 27. If focused for a normal eye, these rays are parallel and are reflected into the eye situated just outside the lens-holder 37. There they converge by the refractive power of the eye and are focused upon the retina, whence they are reflected, emerging again as a parallel beam, a portion of which passes through aperture $m$ of the mirror and through open apertures $n$ and $d$ of the rotatory disk and the auxiliary lens-holder, respectively, passing out through aperture $h$ of the cover-plate into the eye of the operator. For simple ophthalmoscopic inspections the open aperture $i$ will be used instead of the grating. The radial grating 45 can also be brought into use for subjective inspection for the detection of astigmatism, which subjective impressions of the patient can afterward be compared with the accurate objective measurements of the operator.

For stigmatic measurements the operation is as follows: The patient being seated behind the instrument, the face is adjusted in position upon the chin-rest within the face-hoop, and the aperture $m$ of the mirror is brought, by means of the milled head 14, directly opposite the pupil of the eye which is to be inspected, the scale 31 having previously been set to the zero-point. One of the gratings is then brought into the field and carefully focused upon the retina by means of the milled head 22, which moves the rack 21 and scale 31 to the right or left from zero-point, accordingly as the eye should prove to be hyperopic or myopic. The position of the fixed pointer 26 of the scale will indicate the degree of hyperopia or myopia when the image is clear should the eye prove of symmetrical figure, but simply excessive or deficient in refractive power. If the radial grating be employed and certain lines come into focus while others are out of focus, astigmatism is indicated, and the position of the focused lines indicates tentatively the position of the plane of astigmatism. The parallel grating may now be brought into requisition and the angle of astigmatism be accurately noted by means of the circular scale 47 as the grating is rotated to different angular positions. The relative depth of the different foci may thus be accurately determined for any and all meridian planes of the eye, affording positive data for the construction of formulæ for lenses for remedying such inequalities of refraction of any degree whatever, if not too complex for remedy by lenses.

I claim and desire to secure by Letters Patent—

1. In a stigmatometer, or instrument for measuring the refractive powers of the eye, in combination, an illuminated object, a lens for concentrating the light radiated from said object, a perforated mirror for reflecting the beam of light into the eye under inspection, and for permitting inspection through said mirror, a means for shifting said object to focus its image within the eye under inspection, and a graduated scale, movable with the object, for indicating the relative depth of the focus so obtained.

2. In a stigmatometer, a perforated mirror, for reflecting light into the eye to be inspected and for permitting inspection through said mirror, a lens fixed relatively to said mirror, means for adjusting said mirror and lens relatively to the eye under inspection, an illuminated object in the axial line of said mirror and lens, means for shifting said object relatively to the lens to focus its image upon the retina of the eye under inspection, and a sliding graduated scale, movable with the object, for indicating the depth of the focus so obtained.

3. The combination of a perforated mirror, a lens, an illuminated object movable relatively to said lens and mirror, a sliding graduated scale movable with the illuminated object to indicate the focal position of the latter, and a series of lenses mounted for successive interposition between the eye of the operator and the inspection-aperture of the mirror, for correcting the abnormal refraction of the light reflected from the retina of the eye under inspection.

4. The combination of a visual object, a means for artificially illuminating said object, a lens for concentrating the light radiated from said object, a perforated mirror for reflecting the rays of light from the illuminated object into the eye under inspection, and for permitting inspection of the eye so illuminated, a means for shifting the position of the object relatively to the said lens and mirror, to focus the objective image within the eye, a graduated scale movable with the object, for indicating the relative depth of said focus, and a series of lenses arranged for successive interposition between the eye of the operator and that of the patient, for correction of abnormal refraction of light from the eye under inspection.

5. The combination of a perforated mirror, a lens, an illuminated object movable relatively to said lens and mirror, a sliding graduated scale, movable with the illuminated object, to indicate the focal position of its image, and a rotary lens-carrying disk, pivoted in front of the mirror-aperture so as to permit the lens-apertures therein to be successively brought before the mirror-aperture, for correcting the abnormal refraction of light reflected from the retina of the eye under inspection.

6. The combination of a lens, a perforated mirror fixed relatively to said lens, means for shifting lens and mirror to adjust them to the eye under inspection, a sliding scale-piece and scale, movable relatively to said lens and mirror, and a disk pivoted on the end of said scale-piece, having a series of apertures, some of which contain visual objects to be focused on the retina under inspection, said disk revoluble so as to permit said objects to be successively brought into the field of inspection.

7. The combination of the movable scale-piece and scale, the apertured revoluble disk pivoted on the end of said scale-piece, said disk having three apertures, one open, one filled with a radial grating, and one filled with a rotatory parallel line-grating, having a fixed circular graduated scale surrounding said grating.

8. The combination of the perforated mirror, the condensing-lens, the sliding scale-piece and graduated scale, a visual grating mounted on said scale-piece, with means for longitudinally shifting the latter, a rotatory lens-carrying disk geared to the scale-piece to move in unison with it, an auxiliary lens-plate pivoted to oscillate in front of said rotatory disk, and means for periodically and automatically shifting the auxiliary lens-plate to bring its lens-apertures successively into alinement with the lens-apertures of the rotatory disk and with the mirror-aperture.

9. The combination of the condensing-lens, the perforated mirror, the sliding scale-piece and scale, the corrective lenses, means for automatically moving the latter in unison with the movements of the scale, and a lens-holder behind the mirror perforation.

10. In combination with the sliding scale-piece and scale, the perforated mirror, and condensing-lens, the auxiliary lens-holders for holding relieving-lenses for the eye not under inspection.

11. In combination with the sliding scale-piece and scale, the perforated mirror and condensing-lens, the adjustable shield revolubly suspended beneath the said scale-piece.

12. The combination of the sliding scale-piece having toothed rack, the pinion for moving said rack, the graduated scale affixed to said scale-piece, the rotatory lens-disk carrying a circular series of corrective lenses, geared to said rack, to move in unison with the movements of the graduated scale, the auxiliary lens-plate pivoted to oscillate in front of the rotatory lens-disk, having lug 36, spring 40, and the steps or ratchets on the scale-piece, coöperating with said lug to move the auxiliary lens-plate periodically.

13. In a stigmatometer, in combination with a perforated mirror, a condensing-lens, a visual object movable relatively to said mirror and lens, and a graduated scale movable with said object, a compound series of corrective lenses, arranged to be successively brought before the inspection-aperture of the mirror at each graduation of the movable scale, whereby the refractive error of the eye under inspection is corrected for the observer in accordance with the refractive error indicated upon the scale.

14. In a stigmatometer, in combination with a perforated mirror, a condensing-lens, a visual object movable relatively to said mirror and lens, and a graduated scale movable with the said object, a rotatory disk geared to move with the movable scale, containing a circular series of convex lenses corresponding in refractive power to the positive divisions of the scale, and an oscillatory auxiliary lens-plate containing convex and concave lenses, with means to move said lens-plate periodically in coöperation with the rotatory series, to obtain both positive and negative corrections for each division of the movable scale, substantially as specified.

In testimony whereof I have signed my name to this specification in the presence of two subscribing witnesses.

JOHN E. CHAMBERS.

Witnesses:
CHARLES C. INSKEEP,
GUY A. HENRY.